US010450877B2

(12) United States Patent
Boeck

(10) Patent No.: US 10,450,877 B2
(45) Date of Patent: Oct. 22, 2019

(54) GUIDE MEANS FOR A GAS TURBINE AND GAS TURBINE HAVING SUCH A GUIDE MEANS

(71) Applicant: MTU Aero Engines AG, Munich (DE)

(72) Inventor: Alexander Boeck, Kottgeisering (DE)

(73) Assignee: MTU Aero Engines AG, Munich (DE)

( * ) Notice: Subject to any disclaimer, the term of this patent is extended or adjusted under 35 U.S.C. 154(b) by 337 days.

(21) Appl. No.: 14/747,180

(22) Filed: Jun. 23, 2015

(65) Prior Publication Data
US 2015/0377061 A1 Dec. 31, 2015

(30) Foreign Application Priority Data

Jun. 26, 2014 (DE) .................. 10 2014 212 310

(51) Int. Cl.
F01D 9/02 (2006.01)
F01D 9/04 (2006.01)
F01D 17/16 (2006.01)
F04D 29/56 (2006.01)
F01D 11/00 (2006.01)
F01D 25/28 (2006.01)
F04D 29/64 (2006.01)

(52) U.S. Cl.
CPC ............ F01D 9/02 (2013.01); F01D 9/04 (2013.01); F01D 11/005 (2013.01); F01D 17/162 (2013.01); F01D 25/28 (2013.01); F04D 29/563 (2013.01); F04D 29/644 (2013.01); F05D 2220/32 (2013.01); F05D 2230/60 (2013.01); F05D 2240/12 (2013.01); Y02T 50/671 (2013.01); Y10T 29/49323 (2015.01)

(58) Field of Classification Search
CPC . F01D 9/02; F01D 9/04; F01D 11/005; F01D 17/16; F01D 17/162; F01D 25/28
See application file for complete search history.

(56) References Cited

U.S. PATENT DOCUMENTS

| 3,558,237 A | | 1/1971 | Wall, Jr. | |
|---|---|---|---|---|
| 3,663,118 A | * | 5/1972 | Johnson | F01D 17/162 415/116 |
| 4,063,847 A | * | 12/1977 | Simmons | F01D 25/24 415/185 |

(Continued)

FOREIGN PATENT DOCUMENTS

| DE | 102008032661 A1 | 1/2010 |
|---|---|---|
| EP | 0757161 A2 | 2/1997 |

(Continued)

Primary Examiner — Carlos A Rivera
Assistant Examiner — Cameron A Corday
(74) Attorney, Agent, or Firm — Barlow, Josephs & Holmes, Ltd.

(57) ABSTRACT

The invention relates to a guide means (10) for a gas turbine, in particular for an aircraft engine, having at least one casing element (12); having at least one first duct segment (14), which is arranged in the radial direction on the inside of the casing element (12), by means of which at least one duct (16), through which gas can flow, is at least partially delimited outward in the radial direction; having at least one second duct segment (26), which is arranged in the radial direction on the inside of the first duct segment (14), by means of which the duct (26) is at least partially delimited inward in the radial direction; and having at least one guide vane (28).

18 Claims, 7 Drawing Sheets

(56) References Cited

U.S. PATENT DOCUMENTS

| | | | |
|---|---|---|---|
| 4,834,613 A | | 5/1989 | Hansen et al. |
| 5,354,174 A | * | 10/1994 | Balkcum ............... F01D 25/246 |
| | | | 415/189 |
| 6,860,717 B2 | * | 3/2005 | Schipani ............... F01D 17/162 |
| | | | 415/160 |
| 2008/0031730 A1 | | 2/2008 | Houradou et al. |

FOREIGN PATENT DOCUMENTS

| | | |
|---|---|---|
| EP | 1757775 A2 | 2/2007 |
| EP | 2518273 A2 | 10/2012 |
| EP | 2554794 A2 | 2/2013 |
| GB | 1201949 | 8/1970 |
| GB | 2016091 A | 9/1979 |
| GB | 2210935 A | 6/1989 |
| WO | 2005047656 A1 | 5/2005 |

* cited by examiner

GUIDE MEANS FOR A GAS TURBINE AND GAS TURBINE HAVING SUCH A GUIDE MEANS

BACKGROUND OF THE INVENTION

The invention relates to a guide means for a gas turbine, in particular for an aircraft engine, to a gas turbine, in particular an aircraft engine having such a guide means, and to a method for assembly of such a guide means.

Such a guide means for a gas turbine is taken as being known from EP 2 554 794 A2. The guide means comprises at least one casing element as well as at least one first duct segment, which is arranged in the radial direction on the inside of the casing element. At least one duct, through which a gas can flow, is delimited at least partially outward in the radial direction by the first duct segment. The known guide means further comprises at least one second duct segment, which is arranged in the radial direction on the inside of the first duct segment and by means of which second duct segment, the duct is delimited at least partially inward in the radial direction. Moreover, the guide means comprises at least one guide vane, which is arranged at least partially in the duct and which can rotate around an axis of rotation relative to the casing element and relative to the duct segments. The duct is designed as an annular duct or annular space, for example, and serves to guide the gas, which can have a high temperature and accordingly can be a so-called hot gas. The guide vane serves to divert or redirect the gas flowing through the duct and can rotate around the axis of rotation between at least two positions that differ from one another. If, for example, a plurality of guide vanes are provided, which can move and, in particular, rotate relative to the casing element and to the duct segments and are arranged in succession in the circumferential direction, it is thereby possible to create a variable guide vane system or cascade of the gas turbine. The guide vanes and thus the gas turbine as a whole can be adapted as needed at different operating points by rotating the guide vanes, so that it is possible to realize an efficient operation of the gas turbine.

WO 2005/047656 A1 discloses a guide vane cascade for a turbomachine, in particular for a gas turbine, which has a plurality of fixed guide vanes positioned in an annular space or in a main flow duct. The guide vanes are designed so that each one is adjustable around a respective pivot axis, with the radial internal ends thereof bordering a first limiting surface of the annular space and the radial external ends thereof bordering a second limiting surface of the annular space. In this case, it is provided that the first limiting surface of the annular space and/or the second limiting surface of the annular space is embodied in such a manner that, in each pivotable position of the guide vanes, gaps are minimized between the radial internal ends of the guide vanes and the first limiting surface of the annular space and/or gaps are minimized between the radial external ends of the guide vanes and the second limiting surface of the annular space.

Furthermore, EP 0 757 161 A2 discloses a mounting assembly of a guide vane on a casing of a compressor of a gas turbine, wherein the guide vane is mounted on the casing via a bushing. In this case, the bushing is accommodated at least partially in a bore of the casing.

BRIEF SUMMARY OF THE INVENTION

An object of the present invention is to improve a gas turbine and/or the assembly thereof, in particular to create a guide means of the kind mentioned in the introduction as well as a gas turbine, in particular an aircraft engine having such a guide means, by means of which it is possible to realize an especially simple assembly of the guide means as well as an especially efficient operation of the gas turbine.

This object is achieved by a guide means, by a gas turbine, and by a method of the present invention. Advantageous embodiments with appropriate enhancements of the invention are discussed in detail below.

According to an aspect of the present invention, such a guide means for a gas turbine, in particular for an aircraft engine, especially a compressor or a turbine of the gas turbine, comprises at least one casing element, at least one first duct segment, which is arranged in the radial direction on the inside of the casing element, and at least one second duct segment, which is arranged in the radial direction on the inside of the first duct segment. At least one duct, through which a gas can flow, is delimited at least partially outward in the radial direction by the first duct segment. The duct is delimited at least partially inward in the radial direction by the second duct segment. Moreover, the guide means comprises at least one guide vane, which is arranged at least partially in the duct and which can rotate around an axis of rotation relative to the casing element and relative to the duct segments.

The radial direction in one embodiment is perpendicular to an axis of rotation of the gas turbine, in particular an axial direction or an engine main axis or an axis of rotation of a rotor-blade-bearing rotor of the gas turbine, and is directed outward away from it, so that a component that is closer to the axis of rotation is (arranged) radially inward.

Now, in particular, in order to be able to realize an assembly, in particular an especially simple assembly, of the guide means, and/or an especially efficient operation of the gas turbine as a whole, it is provided in one embodiment that the second duct segment is fastened to the guide vane and is retained on the casing element via the guide vane. Additionally or alternatively, in one embodiment, the guide vane is mounted on the casing element via a bushing, which is inserted in the radial direction from the outside to the inside into a passage opening of the casing element.

This embodiment is based, in particular, on the realization that, in conventional guide means, large gaps of the guide vane with respect to the duct, which is designed as an annular space or annular duct, for example, that is, between the guide vane and the duct segments, are often provided. These large gaps are usually provided, in particular in turbines, on account of high temperature differences and the high thermal expansions that thereby ensue so as to ensure that the guide vane can move and thus can be adjusted relative to the casing element and the duct segments, in spite of these thermal expansions. However, these large gaps, which are usually provided, are detrimental to an efficient operation of the gas turbine, because the gaps result in a loss of efficiency. However, the present invention is not limited to turbines or turbine sections of gas turbines, but is particularly advantageous also for compressors or compressor sections of gas turbines.

In a guide means according to the invention, however, it is now possible to employ a guide vane that moves relative to the duct segments and thus to be able to adapt the gas turbine, in particular an aircraft engine, efficiently to different operating points and, at the same time, to create gaps of the guide vane with respect to the duct, in particular gaps that are especially small and/or at least substantially temperature-independent gaps of the guide vane with respect to the duct, that is, between the guide vane and the duct segments. The design of a guide means according to the invention makes it possible namely, in one embodiment, to compensate for the thermal expansions, which occur in principle, by bending the guide vane in the circumferential direction. As a result, undesired flows can be prevented or at least minimized, so that at least the predominant part of the gas flowing through the duct can be effectively and efficiently diverted or redirected by means of the guide vane in a desired manner. Additionally or alternatively, it is possible in one embodiment to achieve a good sealing effect, in particular an especially good sealing effect, in particular in a radially outer region of the duct, so that undesired flows, which are detrimental to the efficiency of the gas turbine, can be at least minimized. As stated above, however, the present invention is not limited to turbines, but is rather advantageous also for compressors, in particular.

Additionally or alternatively, the construction of a guide means according to the invention in one embodiment enables a simple assembly, in particular an especially simple assembly, so that the guide means and the gas turbine on the whole can be produced in a manner that is simple as well as time-efficient and cost-effective, in particular especially simple as well as time-efficient and cost-effective. This is possible, in particular, because the bushing can be inserted into the passage opening of the casing element in the radial direction from the outside to the inside and thus can be mounted. Furthermore, it is preferably provided that, in terms of its dimensions, in particular in terms of its dimension in the radial direction of the gas turbine or in terms of its wall thickness, the bushing is designed in such a way that, when the bushing is dismantled, a predetermined range of movement in which the guide vane and the duct segments can move is afforded, thereby enabling assembly of the duct segments and the guide vane. In other words, the bushing is designed in such a way that, for example, when it is absent, a sufficient clearance is available for assembly of the guide vane and the duct segments. For example, once the duct segments and the guide vane have been arranged and moved into a predeterminable, desired assembly position, the bushing can be inserted in the radial direction from outside to inside into the passage opening, as a result of which the guide vane and, for example, via the latter, the duct segments can be fixed in place in the predeterminable assembly position on the casing element by means of the bushing. For example, it is possible, in the course of assembly of the guide vane and the duct segments, to pull the guide vane outward at least a little bit out of the passage opening and thus out of the casing element in the radial direction. This is accompanied by a movement of at least the outer first duct segment outward in the radial direction, so that it is possible, for example, to realize an especially simple assembly of the inner second duct segment in the casing element.

For realizing a simple assembly, in particular an especially simple assembly, it is provided in one embodiment that the first duct segment has at least one passage opening, through which a region, particularly a trunnion or plate of the guide vane passes, in particular in the radial direction, and/or by means of which the first duct segment is mounted axially and/or in the circumferential direction relative to the casing element.

In another embodiment, the first duct segment has at least two grooves, which are spaced apart in the axial direction and by means of which the first duct segment is mounted relative to the casing element. As a result, in one embodiment, the first duct segment can be retained or mounted on the casing element in manner that is simple as well as time-efficient and cost-effective, in particular especially simple as well as time-efficient and cost-effective. In particular, one embodiment, which can be combined with one or more of the embodiments described above, is characterized in that the first duct segment is mounted relative to the casing element via at least two grooves, which are spaced apart in the axial direction.

Another embodiment, which can be combined with one or more of the embodiments described above, is characterized in that the bushing has a wall thickness that is greater than the length of at least one of the tabs of the first duct segment projecting into one of the grooves. In one embodiment, at least one tab can thereby be inserted simply into the corresponding groove.

In an advantageous embodiment of the invention, which can be combined with one or more of the embodiments described above, the bushing projects inward in the radial direction over at least one wall region of the casing element that borders the bushing. As a result, it is possible to realize a stable assembly, in particular an especially stable assembly, of the guide vane on the casing element via the bushing. Additionally or alternatively, in one embodiment, it is possible in this way to realize an especially great range of movement that is afforded when the bushing has been dismantled and is available for assembly of the guide vane and duct segments.

In particular, in order to realize a simple assembly, in particular an especially simple assembly, of the guide means, it is provided in another embodiment of the invention, which can be combined with one or more of the embodiments described above, that the guide vane has at least one connecting element, in particular a trunnion, that is accommodated at least partially in a corresponding uptake opening of the second duct segment, by means of which element, the guide vane is connected to the second duct segment, with the length of the bushing that projects over the wall region bordering the bushing being greater than the length of the connecting element that projects into the uptake opening.

Finally, it has proven advantageous for realizing a simple assembly, in particular an especially simple assembly, in one embodiment, which can be combined with one or more of the embodiments described above, if a clearance is provided radially between the first duct segment and the casing element, said clearance being greater at least in the radial direction than the length of the connecting element that projects into the uptake opening.

Another embodiment, which can be combined with one or more of the embodiments described above, is characterized in that the guide vane is mounted on the bushing via a bearing element that is provided on the guide vane and is accommodated at least partially in the bushing and at least partially in the passage opening of the casing element. The bearing element is designed as a pin or trunnion, for example, and/or has an outer contour that corresponds at least essentially to the form of a straight circular cylinder. As a result, it is possible to realize a simple assembly, in particular an especially simple assembly, and/or a simple mounting, in particular an especially simple mounting, of the guide vane on the bushing. Preferably, it is provided in this case that, when the bushing has been dismantled, the range of movement is afforded when the bearing element is accommodated at least partially in the passage opening. This means that, when the bushing has been dismantled, the bearing element is accommodated at least partially in the passage opening, with sufficient clearance, in which the guide vane and the duct segments can be moved, being available for the assembly.

In an advantageous embodiment, in particular an especially advantageous embodiment, of the invention, which can be combined with one or more of the embodiments described above, at least one sealing element, in particular a ring seal, is retained on the second duct segment on a side of the second duct segment that faces inward in the radial direction. The inner second duct segment thus has a dual function in one embodiment. On the one hand, the second duct segment serves to delimit the duct. On the other hand, the inner second duct segment serves to retain the ring seal. As a result, it is possible to dispense with additional and separate fastening elements, so that a simple assembly, in particular an especially simple assembly, a small number of parts, and/or a low weight of the guide means can be realized. By means of the ring seal, for example, it is possible to seal the second duct segment against a rotor element, in particular a rotor disc, of a rotor of the gas turbine that can rotate around an axis of rotation or the axis of rotation relative to the casing element, with the axis of rotation of the rotor being directed in the axial direction of the gas turbine.

Additionally or alternatively, in one embodiment, the guide vane also takes on a dual function, because, on the one hand, it serves to divert the gas flowing through the duct and, on the other hand, it serves to fasten or retain the inner second duct segment. Additional or separate retaining segments for retaining and fastening the inner second duct segment can thus be dispensed with, so that an especially small number of parts and an especially simple as well as time-efficient and cost-effective assembly of the guide means can be realized.

For realization of an advantageous sealing effect, in particular an especially advantageous sealing effect, it is provided in another embodiment of the invention, which can be combined with one or more of the embodiments described above, that the sealing element is retained on the second duct segment via a spoke centering. In this way, it is possible to realize an especially precise positioning of the sealing element, so that an especially good sealing effect can be created. The sealing effect of the sealing element against the rotor disc is not impaired by the spoke centering of the sealing element, in particular of the ring seal, in one embodiment. This concept advantageously enables a high efficiency, in particular an especially high efficiency, of the gas turbine to be achieved. Preferably, the ring seal is designed to run completely around in the circumferential direction; that is, it is designed as a closed ring.

It has been found to be particularly advantageous when the casing element is designed to be undivided at least in its circumferential direction. In other words, in one embodiment, which can be combined with one or more of the embodiments described above, the casing element is designed undivided as one piece or one part at least in its circumferential direction. In this way, in one embodiment, the number of parts and/or the effort of assembling the gas turbine as a whole are especially minimized. At the same time, the guide vanes and/or the duct segments can be mounted simply, in particular especially simply, in the casing element designed as an undivided casing. The casing element is designed, for example, as a ring element that is closed in the circumferential direction and thus has a one-part design in the circumferential direction.

In contrast to this, a segmented construction of the duct is provided in one embodiment. This means that, for example, a plurality of successive first duct segments are provided in the circumferential direction, with the first duct segments each partially delimiting the duct outward in the radial direction. Alternatively or additionally, a plurality of second duct segments, which are arranged in succession in the circumferential direction, are provided, by means of which the duct is delimited inward in the radial direction. As a result of this segmented construction, the duct segments, which are connected to one another in a sealed manner via grooves and sealing elements, in particular metal sealing plates, for example, can make temperature-induced movements relative to one another and thus breathe freely, that is, decrease or increase their diameter within certain limits. In this way, excessive thermal expansions of the guide vanes with respect to the duct can be prevented. Therefore, the position of the movable guide vane is fixed via the bushing on the casing element, so that, for example, the temperature-induced movements of the duct segments relative to one another are not overly detrimental to the desired position of the bushing. In particular, excessive thermal stresses between the individual duct segments can be prevented by this segmented construction.

In another embodiment, the second duct segment is undivided in the circumferential direction or is designed in one piece or one part, in particular as a closed (inner) ring in the circumferential direction. Additionally or alternatively, in one embodiment, the sealing element retained on the second duct segment, in particular the ring seal, is undivided in the circumferential direction or designed as one piece or one part. In this way, in one embodiment, it is possible respectively to reduce the weight, to improve the centering, and/or to improve the vibrational stability, which can advantageously bring about greater efficiencies. In particular, for a second duct segment that is undivided in the circumferential direction, a seal against a rotor of the gas turbine can also be arranged tightly on the second duct segment; in particular, it can be connected to it cohesively or can be designed to be integral with it.

Another embodiment, which can be combined with one or more of the embodiments described above, is characterized in that the casing element, the guide vane, and the duct segments are designed as components that are constructed separate from one another and are connected to one another at least indirectly. In this way, it is possible to prevent excessive thermal stresses between the guide vane, the casing element, and the duct segments, because the components can move relative to one another.

Another aspect of the invention relates to a gas turbine, in particular an aircraft engine, having at least one guide means described here. Advantageous embodiments of the guide means according to the invention are to be regarded as advantageous embodiments of the gas turbine according to the invention and vice versa.

In one embodiment, the first duct segment is or will be connected, in particular in a detachable manner, to the casing element by means of at least one first retaining segment. In this way, in one embodiment, particularly the assembly and/or disassembly can be facilitated.

In one embodiment, the multiple-stage guide means has at least one additional first duct segment, which is spaced apart from the (one) first duct segment in the axial direction of the gas turbine, and at least one additional guide vane, which can rotate around an additional axis of rotation, which is spaced apart from the (one) axis of rotation in the axial direction of the gas turbine, relative to this additional first duct segment. As explained above, in one embodiment, a region, in particular a trunnion or plate, of this additional guide vane engages through a passage opening of this additional first duct segment, in particular in the radial direction. In one embodiment, a guide vane system or cascade of the gas turbine is provided or arranged in the axial direction of the gas turbine between the (one) guide vane and the additional guide vane.

In one embodiment, the additional first duct segment is or will be connected to the casing element, in particular in a detachable manner, by means of the first retaining segment. Accordingly, in one embodiment, this first retaining segment can advantageously fulfill a dual function for connecting two first duct segments spaced apart in the axial direction of the gas turbine.

Additionally or alternatively, in one embodiment, the additional first duct segment is or will be connected to the casing element, in particular in a detachable manner, by means of at least one second retaining segment, in particular subsequent to a connection by means of the first retaining segment and/or, in the same way as previously for the (one) first retaining segment, by means of the first retaining segment.

In one embodiment, the guide means can have at least one other additional first duct segment, which is spaced apart from the additional first duct segment in the axial direction of the gas turbine, and at least one other additional guide vane, which can rotate around another additional axis of rotation, which is spaced apart from the additional axis of rotation of the gas turbine in the axial direction relative to this other additional first duct segment. As explained above, in one embodiment, a region of this other additional guide vane, in particular a trunnion or plate, engages through a passage opening of this other additional first duct segment, in particular in the radial direction. In one embodiment, an additional guide vane cascade of the gas turbine is provided or arranged in the axial direction of the gas turbine between the additional guide vane the other additional guide vane.

In one embodiment, the other additional first duct segment is or will be connected to the casing element, in particular in a detachable manner, by means of the second retaining segment. Accordingly, in one embodiment, this second retaining segment can also advantageously fulfill a dual function for connecting two first duct segments spaced apart in the axial direction of the gas turbine or function in turn as a first retaining segment with respect to the additional first duct segment and the other additional first duct segment. Correspondingly, in one embodiment, the other additional first duct segment is or will be connected to the casing element, in particular in a detachable manner, by at least an additional second retaining segment, in particular subsequent to a connection by the (one) second retaining segment and/or, in the same way as previously for the additional first duct segment, by the (one) second retaining segment.

Accordingly, in one embodiment, two or more first duct segments, which are spaced apart in the axial direction of the gas turbine, can be or are advantageously connected to or stacked on the casing element, in particular one after the other. In one embodiment, particularly the assembly and/or disassembly can be improved in this way.

Additionally or alternatively to a second retaining segment, which connects two first duct segments, which are spaced apart in the axial direction of the gas turbine, to the casing element; a first duct segment, which lies closest to an outlet opening of the casing element in the axial direction of the gas turbine, can be or is connected to the casing element by at least one retaining segment, in particular in a detachable manner, in one embodiment.

In one embodiment, this retaining segment is undivided in the circumferential direction of the casing element and/or retaining segment or is designed as a terminating ring. In this way, in one embodiment, it is possible advantageously to improve the connection of a submodule of the gas turbine to the guide means.

The retaining segment, by means of which the first duct segment closest to the outlet opening is connected to the casing element, can be the aforementioned first or (additional) second retaining segment. Similarly, it also can be a third retaining segment differing from the latter.

In one embodiment, the retaining segment, by means of which a first duct segment, in particular the (one) first duct segment, the additional first duct segment, and/or the other additional first duct segment, is connected to the casing element is arranged (respectively) on a side of this first duct segment that faces an outlet opening or the outlet opening of the casing element or in the flow direction of the gas turbine downstream of the duct segment. In this way, in one embodiment, the assembly and/or stability can advantageously be improved.

In one embodiment, the retaining segment is or will be connected to the casing element, in a (respectively) detachable manner, in particular in a frictionally engaged manner, by means of a first duct segment, in particular the (one) first duct segment, the additional first duct segment, and/or the other additional first duct segment. In an enhancement, the retaining segment is or will be screwed to the casing element radially or in the radial direction and/or from the outside or from an outer side of the casing element. In one embodiment, the assembly and/or stability can advantageously be improved in this way.

In one embodiment, the retaining segment is or will be connected to the casing element, in a (respectively) detachable manner, in particular in a cohesive manner, by means of a first duct segment, in particular the (one) first duct segment, the additional first duct segment, and/or the other additional first duct segment. In an enhancement, a tab of this retaining segment engages in a groove in this first duct segment, in particular in the axial direction of the gas turbine or a tab of this first duct segment engages in a groove in this retaining segment, in particular in the axial direction of the gas turbine. In one embodiment, the assembly and/or stability can advantageously be improved in this way.

In one embodiment, a sealing plate, in particular one that is divided, is arranged in a (respective) gap between a passage opening of a first duct segment, in particular of the (one) first duct segment, the additional first duct segment, and/or the other additional first duct segment, and a region of the corresponding guide vane engaging through this passage opening. In one embodiment, it is possible to increase the efficiency in this way. In particular, it is possible in one embodiment to realize in this way a play between the first duct segment and the guide vane in the longitudinal direction of the passage opening, while, at the same time, reducing any leakage.

BRIEF DESCRIPTION OF THE DRAWINGS

Further advantages, features, and details of the invention ensue from the following description of a preferred exemplary embodiment as well as on the basis of the drawings. The features and combinations of features mentioned above in the description as well as the following features and combinations of features mentioned in the description of the figures and/or shown solely in the figures can be used not only in the respectively presented combinations, but also in other combinations or individually, without departing from the scope of the invention.

Shown are.

In the figures, identical or functionally identical elements are provided with identical reference numbers.

DETAILED DESCRIPTION OF THE INVENTION

Figure 1:
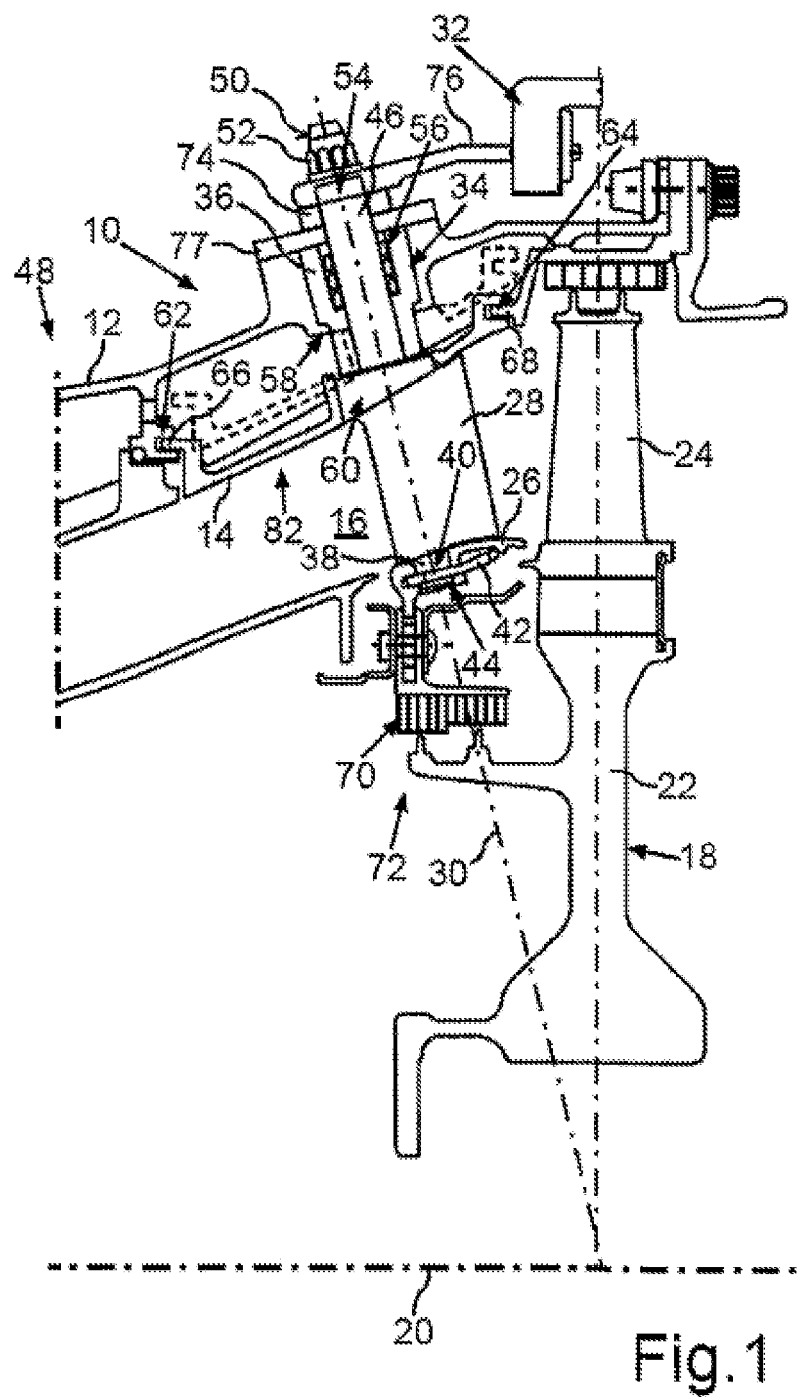
FIG. 1 a schematic longitudinal sectional view, excerpted, of a guide means for a gas turbine having at least one casing element, having at least one first duct segment, having at least one second duct segment, and having at least one guide vane, which is mounted on the casing element via a bushing, with the second duct segment being fastened to the guide vane and being retained on the casing element via said guide vane.

FIG. 1 shows a guide means, identified as a whole by reference 10, for a gas turbine. The guide means 10 comprises at least one casing element 12, which is designed in one part, that is, in one piece, in the circumferential direction of the gas turbine, for example, and thus of the casing element 12. In this case, the casing element 12 is designed, for example, as a ring that runs completely around in the circumferential direction, that is, a closed ring. Moreover, the guide means 10 comprises a plurality of first duct segments, which are arranged on the inside of the casing element 12 in the radial direction of the casing element 12 or of the gas turbine, one of which, a duct segment identified by reference 14, can be seen in FIG. 1. The plurality of first duct segments are arranged in succession in the circumferential direction. The following statements regarding the first duct segment 14 can be applied also to the other first duct segments in a straightforward manner.

It can be seen from FIG. 1 that the outer first duct segment 14 is spaced apart from the casing element 12 at least partially and at least predominantly inward in the radial direction. Moreover, at least one duct 16, through which a gas can flow, is delimited at least partially outward in the radial direction by the outer first duct segment 14. The gas has a high temperature and is thus a hot gas and is conveyed via the duct 16 to at least one rotor 18 of the gas turbine. The rotor 18 can rotate relative to the casing element 12 around an axis of rotation 20 and comprises a rotor disc 22 and a plurality of rotor blades, one rotor blade of which, identified by reference 24, can be seen in FIG. 1. In this case, the axis of rotation 20 extends in the axial direction of the gas turbine and thus of the casing element 12.

Moreover, the guide means 10 comprises at least one second duct segment 26, which is arranged on the inner side of the first duct segment 14 in the radial direction. The inner second duct segment 26 can be designed to run completely around in the circumferential direction, that is, as a closed ring. Alternatively to this, there is provided a plurality of inner second duct segments, which are arranged in succession in the circumferential direction. In this case, the duct segment 26 is one of a plurality of second duct segments. Thus, the following statements regarding the second duct segment 26 can also be applied in a straightforward manner to the other second duct segments that, if need be, have been provided.

The duct 16 is delimited inward in the radial direction at least partially by the second duct segment 26. This means that a segmented construction of the duct 16 is provided, because it is delimited outward in the radial direction by the plurality of first duct segments and inward in the radial direction by the second duct segments. Moreover, the guide means 10 comprises a plurality of guide vanes, which are arranged in succession in the circumferential direction. One guide vane, identified by reference 28, of this plurality of guide vanes can be seen in FIG. 1. The following statements regarding the guide vane 28 can be applied to the other guide vanes in a straightforward manner. The guide vane 28 is arranged at least partially in the duct 16 and can rotate relative to the casing element 12 as well as relative to the duct segments 14, 26 around an axis of rotation 30. It can be seen from FIG. 1 that the axis of rotation 30 is inclined with respect to the axis of rotation 20 of the rotor 18.

A variable turbine guide vane system or cascade, by means of which the gas flowing through the duct 16 can be diverted as needed, is created by the plurality of guide vanes. The turbine guide vane cascade, that is, the guide vane 28, is arranged upstream of the rotor blade 24 in the direction of flow of gas through the duct, so that the gas flowing through the duct 16 can be diverted or redirected upstream of the rotor blade 24 by means of the guide vane 28. As a result, the gas that is diverted by means of the guide vane 28 can flow against the rotor blade 24 at a flow angle, by means of which it is possible to realize an especially efficient and efficiency-promoting operation of the gas turbine. The flow angle can be varied by rotating the guide vane 28 around the axis of rotation 30, so that, in this way, the turbine guide vane cascade and thus the gas turbine as a whole can be adapted as needed to different operating points.

For this purpose, the guide vane 28 is coupled via a coupling device 32 to at least one actuator, by means of which the guide vane 28 can be rotated via the coupling device 32 relative to the casing element 12 around the axis of rotation 30. As a result, the guide vane 28 can be adjusted, for example, between at least two positions that differ from one another. The duct 16 is designed as an annular duct or annular space, for example, so that the duct segments 14, 26 are also referred to as annular space segments. In this case, the individual annular space segments, that is, for example, the plurality of first duct segments and/or the plurality of second duct segments are connected to one another in a sealed manner via grooves and sealing elements, in particular in the form of metal sealing plates. Thermal expansions at the respective guide vanes with respect to the annular space can be prevented or at least minimized by the segmentation of the duct 16.

In order to realize an especially simple assembly of the guide means 10 and of the gas turbine as a whole, as well as a particularly efficient operation of the gas turbine, the second duct segment 26 is fastened to the guide vane 28 and to the casing element 12 via the guide vane 28. In this case, the guide vane is mounted on the casing element 12 via a bushing 36, which is inserted in the radial direction from outside to inside into a passage opening 34 in the casing element 12.

It can be seen from FIG. 1 that the guide vane 28 has a connecting element in the form of a trunnion 38, which is accommodated at least partially in a corresponding uptake opening 40 of the second duct segment 26 that, in the present case, is designed as a passage opening. The guide vane 28 is connected via the trunnion 38 by means of at least one fastening element in the form of a pin 42 to the second duct segment 26, with the pin 42 having predominantly a U-shaped design. This means that the second duct segment 26 is fastened by means of the U-shaped pin 42 to the guide vane 28 via its trunnion 38. As can be seen by looking at FIGS. 2 and 3 together, the pin 42 is inserted into corresponding uptake openings of the second duct segment 26, which are spaced apart in the circumferential direction of the casing element 12, and engages in a completely circumferential groove 44 of the trunnion 38. In this way, the pin 42 acts in a form-fitting manner together with both the second duct segment 26 and with the guide vane 28, so that the second duct segment 26 is retained at least in a form-fitting manner and at least radially on the guide vane 28 via the pin 42.

The guide vane 28 further has a bearing element in the form of a trunnion 46. The trunnion 46 is a rod element and has an outer contour with a form that corresponds at least essentially to a form of straight circular cylinder. The trunnion 46 is accommodated at least partially in the bushing 36. Furthermore, the trunnion 46 is accommodated at least partially in the passage opening 34 of the casing element 12. It can be seen from FIG. 1 that the trunnion 46 passes through both the bushing 36 and the passage opening 34 and thus projects on an outer side 48 of the casing element 12 outward in the radial direction.

In a subregion arranged on the outside of the casing element 12, that is, on the outer side 48, the trunnion 46 has an outer thread 50, onto which a nut 52 is screwed. The guide vane 28 is secured in the radial direction and is connected to the coupling device 32 by means of the nut 52. In another subregion 54, the trunnion 46 has an outer contour that is not round—for example, a polygonal, in particular quadrangular, outer contour—by means of which the trunnion 46 is connected in a rotationally rigid manner to the coupling device 32. As a result, torques can be transmitted between the trunnion 46 and the coupling device 32, so that, in this way, the guide vane 28 can be rotated. Moreover, a sealing element in the form of a packing gland 56 is provided, which is arranged in the radial direction of the bushing 36 between it and the trunnion 46.

The bushing 36 projects inward in the radial direction over at least one wall region 58 of the casing element 12 bordering the bushing. In this case, it is preferably provided that the bushing 36 of the casing element 12, which can be mounted from the outside in the radial direction, projects so far inward in the radial direction and has such a thick wall thickness that, when the bushing 36 is dismantled, there is sufficient clearance for assembly of the duct segments 14, 26 and of the guide vane 28. An assembly position of the first duct segment 14, which the first duct segment 14 can assume when the bushing 36 has been dismantled, is illustrated in FIG. 1 by a dashed line. This means that the first duct segment 14 is moved into the assembly position when the guide vane 28 is mounted.

The first duct segment 14 has a passage opening 60, through which the guide vane 28 passes. In this way, the duct segment 14 can be fixed in position in the axial direction and in the circumferential direction relative to the casing element 12 via the guide vane 28 and the bushing 36. Moreover, the first duct segment 14 is fixed in position radially via at least one front groove 62 and via a least one rear groove 64 on the casing element 12. In this case, the front groove 62 is provided on the casing element 12, with a tab 66 of the first duct segment 14 engaging at least partially in the front groove 62. The rear groove 64 is provided on the first duct segment 14, with a tab 68, provided on the casing element 12, engaging in the rear groove 64.

Moreover, the guide means 10 comprises a sealing element in the form of a ring seal 70, which is fastened to the second duct segment 26 on a side 72 of the second duct segment 26 that faces inward in the radial direction. This means that, for example, the ring seal 70, which runs completely around in the circumferential direction of the casing element 12, that is, the closed ring seal, is fastened to the respective second duct segments, so that no additional fastening elements are provided or are required for retaining and fastening the ring seal 70. The second duct segment 26 is sealed against the rotor disc 22 by means of the ring seal 70.

Overall, it can be seen that the casing element 12, the guide vane 28, and the duct segments 14, 26 are designed as components that are produced separately from one another and are connected at least indirectly to one another, with the guide vane 28 and the duct segment 14, 26 forming, together with the ring seal 70, a combined component, which is retained on the casing element 12 via the guide vane 28 and the bushing 36 and is suspended from it. In FIG. 1, moreover, an adjustment disc or shim 74 is provided, which is arranged between a lever arm 76 of the coupling device 32 and a cover 77.

For realization of an advantageous retaining and centering of the ring seal 70, it is provided that the ring seal 70 is retained on the second duct segment 26 via a spoke centering. In this case, a groove 78 for the spoke centering of the ring seal 70 can be seen, which is provided on the second duct segment 26 in FIG. 2. Furthermore, in FIG. 2, two of the first duct segments can be seen, which are arranged in succession in the circumferential direction of the casing element 12. Provided at the respective first duct segment 14 is an annular space contouring piece 80, which is arranged on a side 82 of the respective duct segment 14 that faces inward in the radial direction and borders the duct 16. A gap between the guide vane 28 and the respective first duct segment 14 can be kept at least essentially constant in different positions of the guide vane 28 by means of the annular space contouring piece 80.

Preferably, a narrow and, in particular, sealing fit is provided between the guide vane 28 and the first duct segment 14 and/or between the guide vane 28 and the second duct segment 26, which, although it permits a rotation of the guide vane 28 relative to the duct segments 14, 26, otherwise fixes in position the respective duct segment 14 and/or 26 in the axial direction and in the circumferential direction.

The duct segment 14, designed as an annular space segment, is retained in a rotationally fixed manner on the casing element 12, whereby it is fixed in position also in the radial direction of the casing element 12 and can thus breathe together with the casing element 12 during thermal expansion; that is, it can move. In comparison to a one-piece construction of the casing element 12 with the duct segments 14, 26, the design of the casing element 12 and of the duct segments 14, 26 as separate components has the advantage that excessive thermal stresses can be prevented.

In this case, the first duct segment 14, as shown in the embodiment depicted in the figures, is preferably fixed in position in the axial direction and in the circumferential direction essentially via the guide vane 28 and the bushing 36 relative to the casing element 12, whereas a local fixation of the first duct segment 14 in the radial direction relative to the casing element 12 occurs essentially by way of the two grooves 62, 64. Through this kind of fastening of the first duct segment 14 to the casing element 12 and through the spoke-centered suspension of the ring seal 70 on the second duct segment 26, an essentially stress-free and low-gap operation of the guide means 10 is made possible. In this way, the component sections of the guide means 10 that come into direct contact with the hot gas in the duct 16, namely, the guide vane 28, the first duct segment 14, and the second duct segment 26, can expand, without introducing stresses into the casing element 12 and/or the ring seal 70.

As already described above, the first duct segment 14 and the second duct segment 26 preferably do not form a closed ring in the circumferential direction in this case, but rather only form circular ring segments. This enables the segments to breathe together with the casing element 12 during thermal expansion. In this case, metal sealing plates, which are not depicted in the figures, can be provided in the circumferential direction between mutually adjacent first duct segments 14 and/or between mutually adjacent second duct segments 26 and ensure a sealing of the duct 16 in the radial direction during breathing.

Figure 2:
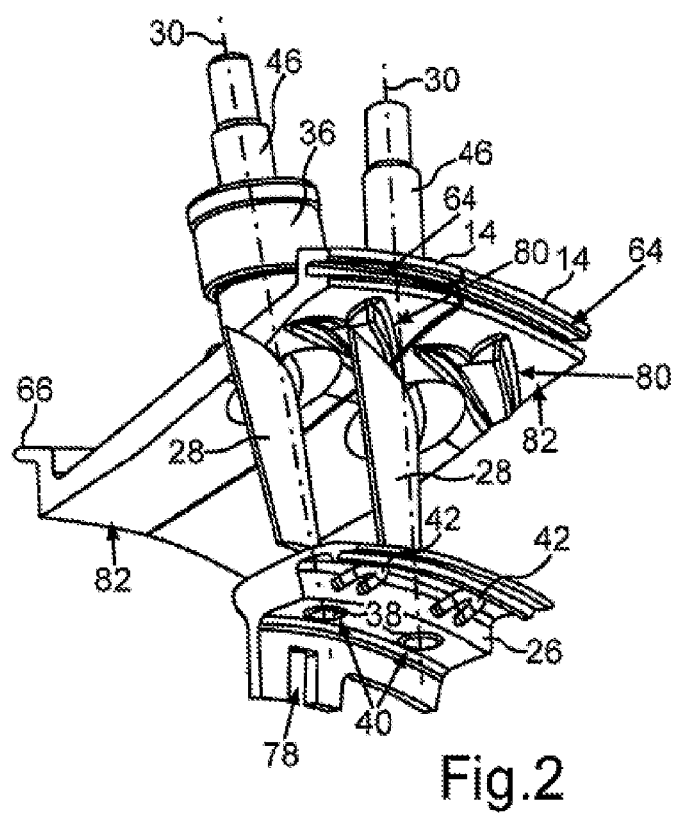
FIG. 2 a schematic perspective view of the guide means.

In addition, it is noted that—as illustrated in FIG. 2—a respective first duct segment 14 can be assigned to one or a plurality of respective guide vanes 28 and a second duct segment 26 can be assigned to a plurality of guide vanes—in the illustrated exemplary embodiment, two guide vanes.

Figure 4:
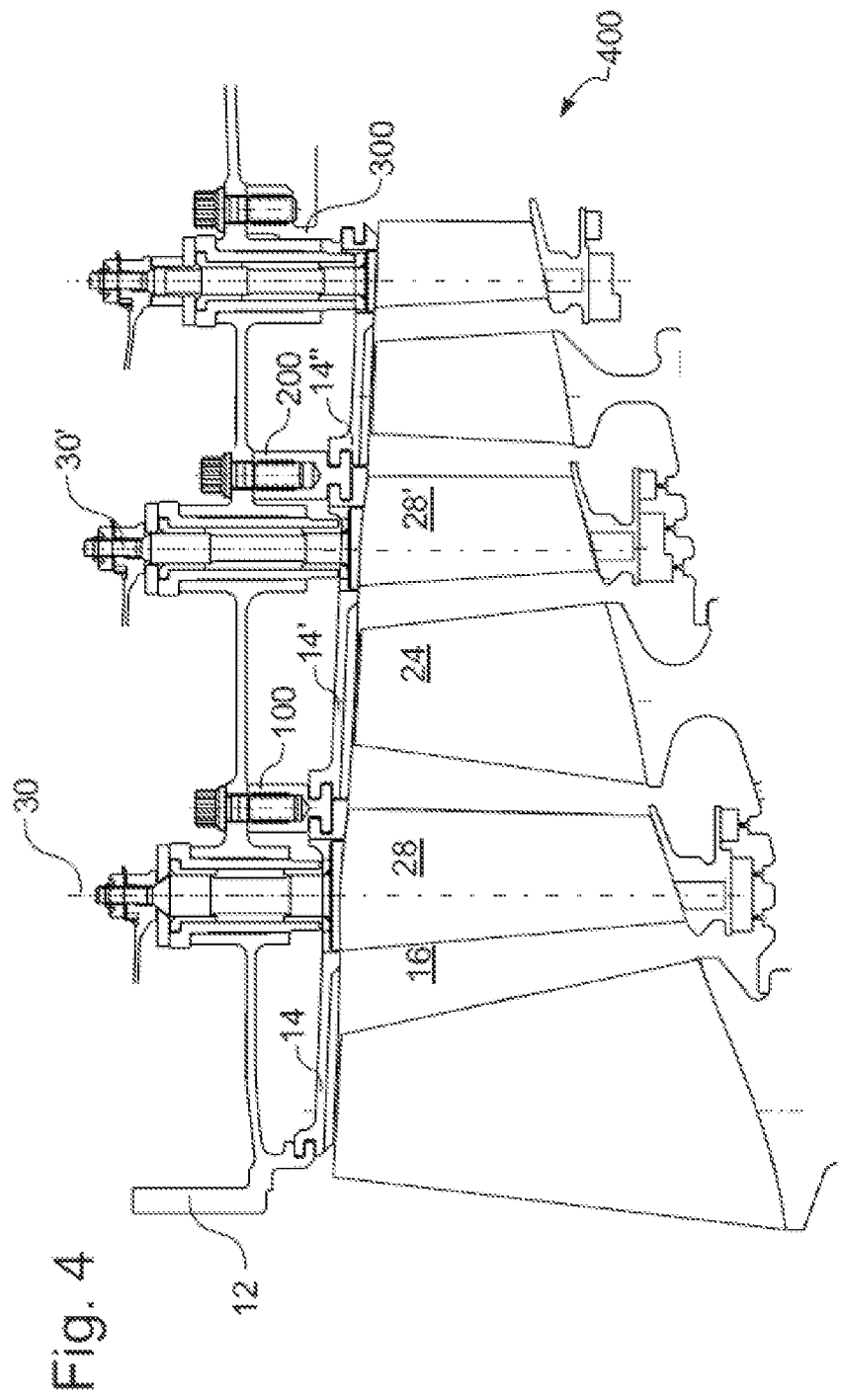
FIG. 4 a schematic longitudinal view, excerpted, of a guide means according to another embodiment of the present invention.

FIG. 4 shows a guide means according to another embodiment of the present invention; reference is made to the previous explanations for the description thereof and differences will be addressed below.

Figure 5:
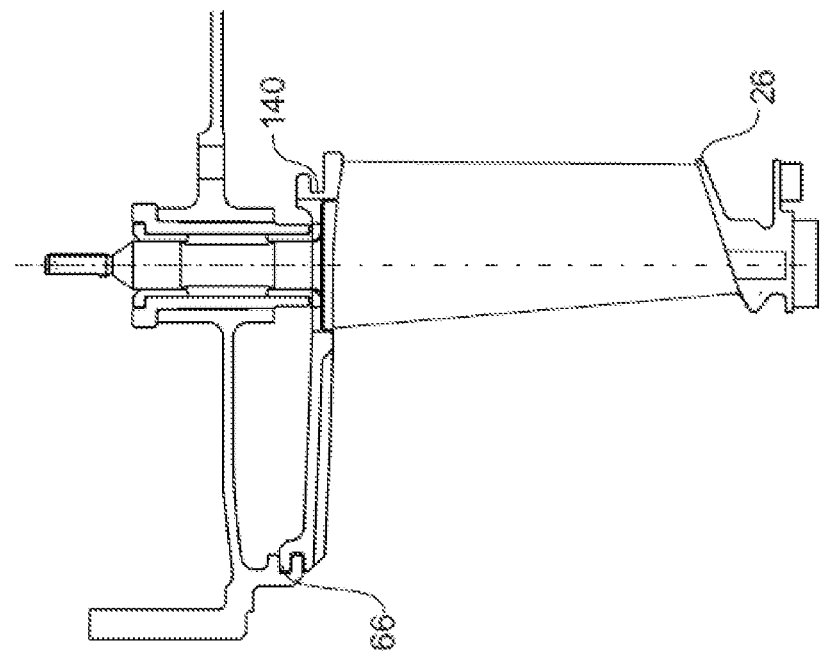
FIG. 5-9 assembly steps of the guide means.
Figure 6:
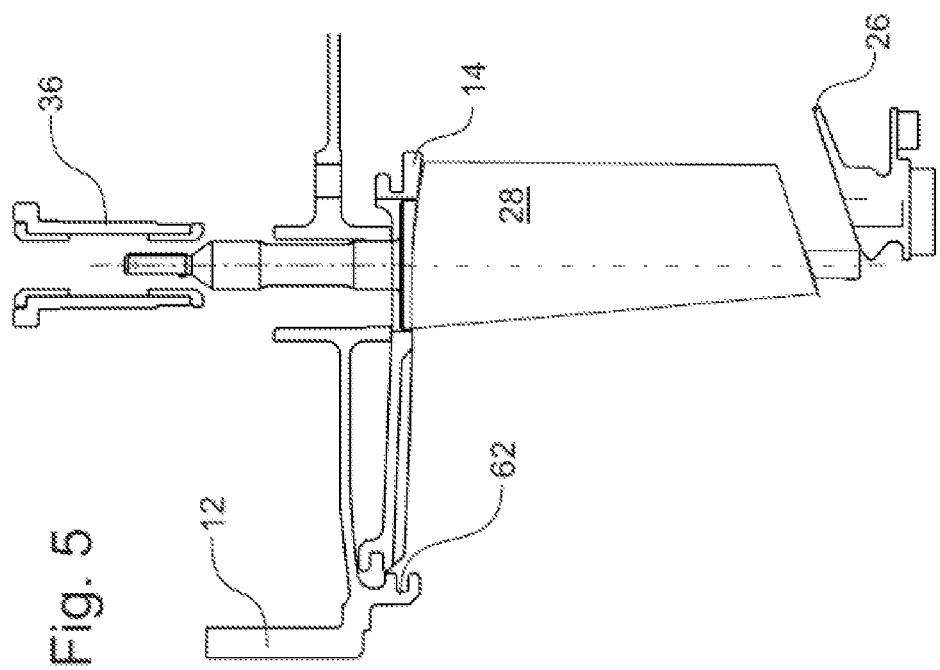

For assembly of the guide means of FIG. 4, as shown in FIG. 5, a plurality of first duct segments 14, which are distributed in the circumferential direction, one of which is sectioned in the longitudinal view of FIG. 5, are first of all introduced in the axial direction of the gas turbine (horizontal in FIG. 5) into the casing element 12 (from right to left in FIG. 5), the guide vane 28 is inserted radially (vertically in FIG. 5; from bottom to top in FIG. 5), a second duct segment 26, which is undivided in the circumferential direction, is introduced in the axial direction of the gas turbine into the casing element 12 (from right to left in FIG. 5), the guide vanes 28 with the first duct segments 14 are inserted into the second duct segment 26 (from top to bottom in FIG. 5), and the bushing 36 is inserted into the casing element 12 (from top to bottom in FIG. 5), so that the state of assembly shown in FIG. 6 results.

Figure 7:
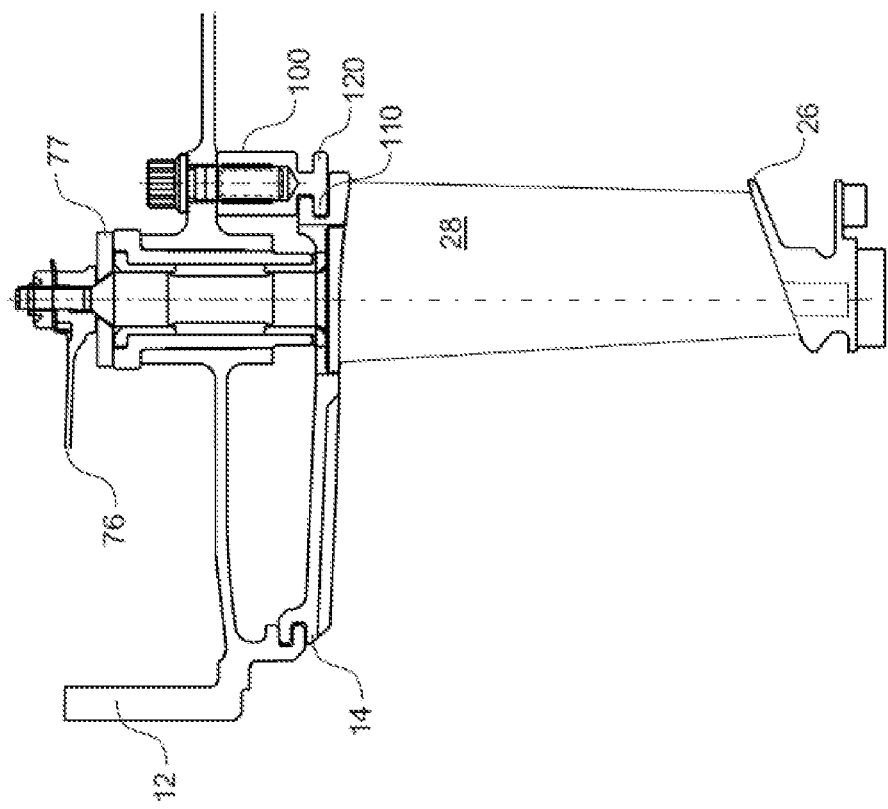

Then, a plurality of first retaining segments 100, which are distributed in the circumferential direction and one of which is sectioned in the longitudinal view of FIG. 7, are introduced in the axial direction of the gas turbine into the casing element 12 (from right to left in FIG. 5). In the process, a respective tab 110 of the first retaining segments 100 engages in a groove 140 (compare FIG. 6) in the first duct segment 14.

Subsequently, the first retaining segments 100 are screwed radially from the outside together with the casing element 12 and cover 77 and lever element 76 are mounted, so that the state of assembly shown in FIG. 7 results.

Figure 8:
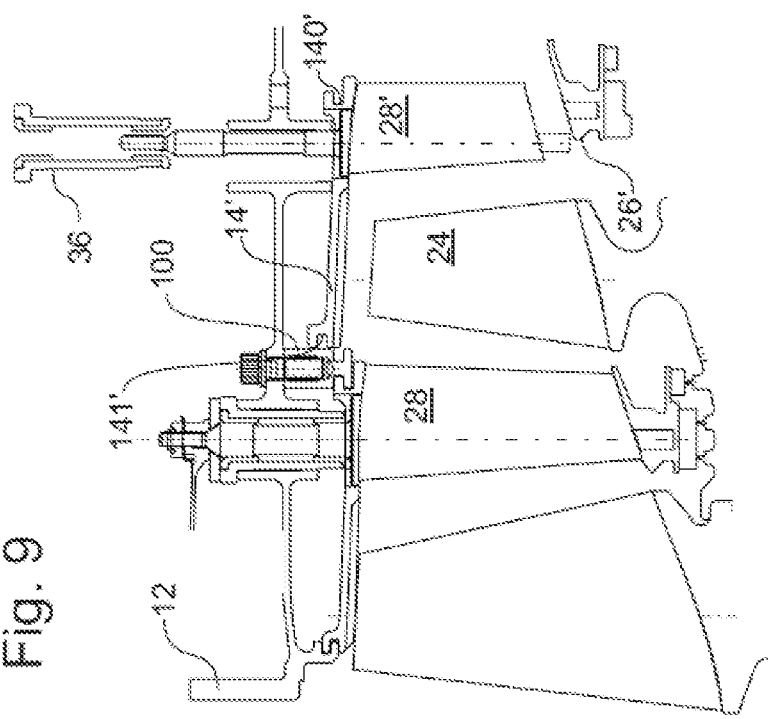
Figure 9:
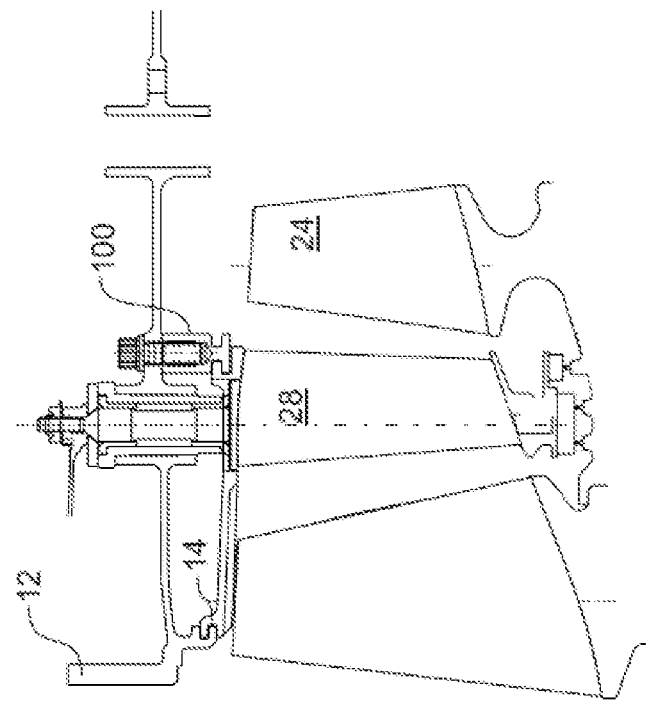

After assembly of a following or downstream rotor blade system or cascade having rotor blades 24 (see FIG. 8) in the flow direction (from left to right in FIG. 8), a plurality of additional first duct segments 14' are introduced into the casing element 12 in the same way as described previously, as shown in FIG. 9, in the axial direction of the gas turbine (from right to left in FIG. 9); additional guide vanes 28', which can rotate around additional axes of rotation 30', are inserted radially (from bottom to top in FIG. 9); an additional second duct segment 26', which is undivided in the circumferential direction, is introduced into the casing element 12 in the axial direction of the gas turbine (from right to left in FIG. 9); and the additional guide vanes 28' with the additional first duct segments 14' are inserted into the additional second duct segment 26' (from top to bottom in FIG. 9). In the process, a respective tab 120 of the first retaining segments 100 (see FIG. 7) engages in a groove 141' in the additional first duct segment 14'. Here, too, bushings 36 are once again inserted.

Then, a plurality of second retaining segments 200, which are distributed in the circumferential direction, are introduced into the casing element 12 in the axial direction of the gas turbine (from right to left in FIG. 5). In the process, a respective tab of the second retaining segments 200 engages in a groove 140' in the additional first duct segment 14' (see FIG. 9), as was explained above with reference to FIG. 8 and the first retaining segments 100.

Subsequently, the second retaining segments 200 are screwed together with the casing element 12 radially from the outside (from top to bottom in FIG. 9) and cover and lever element are mounted.

These assembly steps can be repeated in the same way for additional stages of the guide means. The embodiment in FIG. 4 shows by way of example other additional first duct segments 14", which are (have been) connected to the casing element 12 by the second retaining segments 200 in the same way as explained above with reference to the additional first duct segments 14' and the first retaining segments 100.

These other additional first duct segments 14" are (have been) connected to the casing element 12 on their side facing an outlet opening 400 of the casing element 12 by a third retaining segment 300, which is undivided in the circumferential direction, in an analogous way to that described above with reference to the first duct segments 14 and the first retaining segments 100 or the additional duct segments 14' and the second retaining segments 200.

Figure 10:
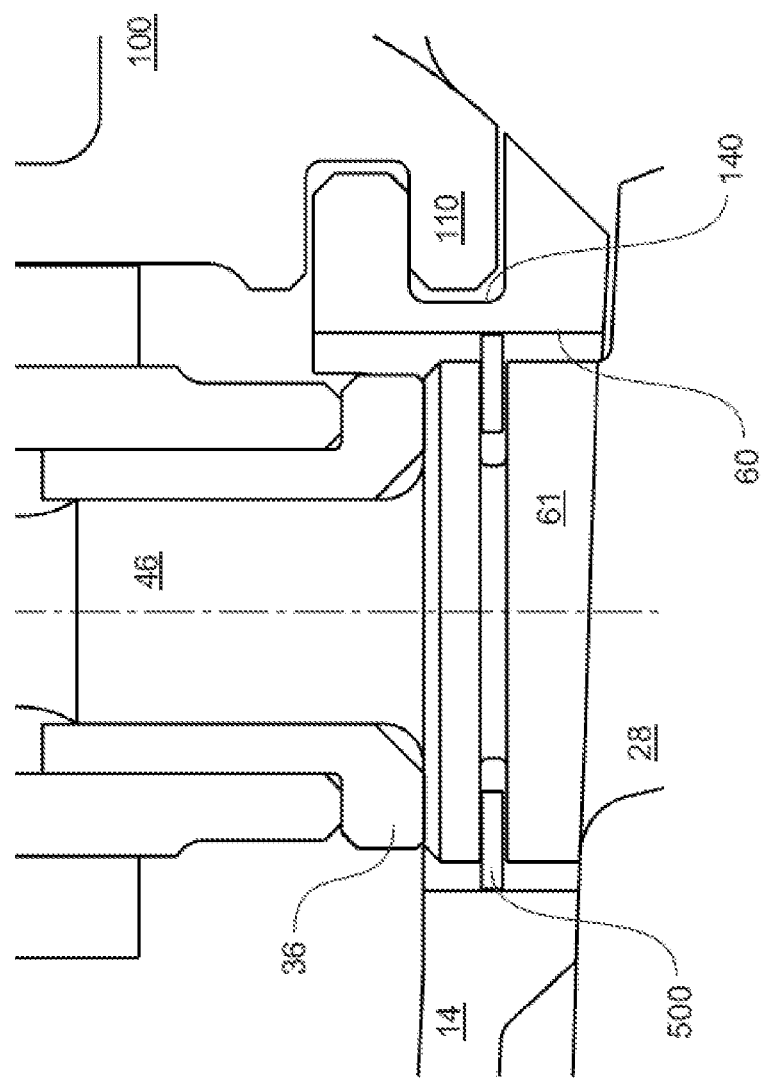
FIG. 10 an enlarged excerpt of the guide means in the region of the passage opening in a first duct segment.

FIG. 10 shows an enlarged excerpt of the guide means in the region of a passage opening 60 in a first duct segment 14. It can be seen that a divided sealing disc 500 is arranged in the gap between the passage opening 60 and a plate 61 of the guide vane 28 that engages through this passage opening.

Even though exemplary embodiments were described in the preceding description, it is noted that a large number of modifications are possible.

Figure 3:
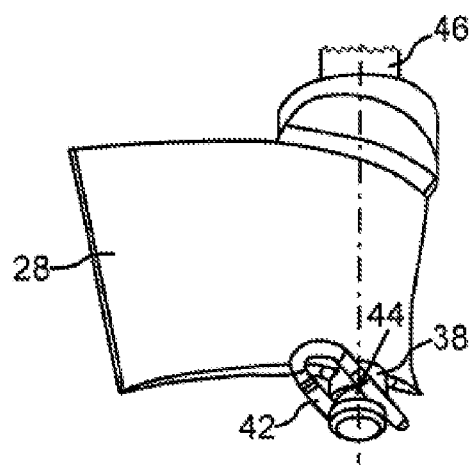
FIG. 3 another schematic perspective view of the guide means.

Thus, in particular in the embodiment of FIGS. 4-10, instead of one or several second duct segments 26, 26' are provided, which are undivided in the circumferential direction and have a honeycomb seal arranged in fixed position on them, also a plurality of respective second duct segments, which are distributed in the circumferential direction and/or a seal ring 70, which is retained via a spoke centering on second duct segment(s), which are one-piece or distributed in the circumferential direction, as was explained with reference to FIGS. 1-3.

Moreover, it is noted that the examples are merely exemplary embodiments, which are not intended to limit the protective scope, the applications, and the design in any way. Instead, the preceding description provides the person skilled in the art with a guideline for implementing at least one exemplary embodiment, with it being possible to make diverse modifications, in particular in regard to the function and arrangement of the described components, without departing from the protective scope, as ensues from the claims and these equivalent combinations of features.

The invention claimed is:

1. A guide for a gas turbine comprising:
a casing element;
a first duct segment, which is arranged in the radial direction on the inside of the casing element, wherein a duct, through which gas can flow, is at least partially delimited outward in the radial direction;
a second duct segment, which is arranged in the radial direction on the inside of the first duct segment, wherein the duct is at least partially delimited inward in the radial direction; and
a guide vane, which is arranged at least partially in the duct and which can rotate around an axis of rotation relative to the casing element and relative to the first duct segment and the second duct segment,
wherein the guide vane has a first retaining segment, the first retaining segment including a bolt screwed through the first retaining segment to the casing element radially inward from the outside, by which the first duct segment is connected to the casing element, in a detachable manner with a tab of the first retaining segment engaging in a groove in the first duct segment, in the axial direction of the gas turbine, and an arm defining a portion of the groove of the first duct segment engages in a second groove in the first retaining segment defined in part by the tab, in the axial direction of the gas turbine;
wherein the second duct segment is fastened to the guide vane and is retained on the casing element via the guide vane, which is mounted on the casing element via a bushing, which is inserted in the radial direction from outside to inside into a passage opening of the casing element and
wherein the tab is disposed radially inward of a threaded portion of the first retaining segment.

2. The guide according to claim 1, wherein a third duct segment, which is spaced apart from the first duct segment in the axial direction of the gas turbine, and a second guide vane, which can rotate around an additional axis of rotation, which is spaced apart in the axial direction of the gas turbine from the axis of rotation, relative to the first duct segment, wherein the third duct segment is connected to the casing element by the first retaining segment and a second retaining segment in a detachable manner.

3. The guide according to claim 1, wherein said first duct segment, which is close to an outlet opening in said casing element, is connected to the casing element by a third retaining segment in a detachable manner.

4. The guide according to claim 3, wherein the retaining segment, by which the first duct segment is connected to the casing element, is undivided in its circumferential direction.

5. The guide according to claim 1, wherein the first retaining segment, by which the first duct segment is connected to the casing element, is arranged on a side of this first duct segment that faces an outlet opening of the casing element.

6. The guide according to claim 1, wherein a sealing disc is arranged in a gap between a passage opening of the first duct segment and a region of the guide vane that engages through the passage opening.

7. The guide according to claim 1, wherein the sealing element is retained on the second duct segment via a centering spoke.

8. The guide according to claim 1, wherein the guide is configured and arranged for use in a gas turbine.

9. The guide according to claim 1, wherein a third duct segment, which is spaced apart from the first duct segment in the axial direction of the gas turbine, is connected to the casing element by the first retaining segment and by a second retaining segment.

10. A guide for a gas turbine comprising:
a casing element;
a first duct segment, which is arranged in the radial direction on the inside of the casing element, wherein a duct, through which gas can flow, is at least partially delimited outward in the radial direction;
a second duct segment, which is arranged in the radial direction on the inside of the first duct segment, wherein the duct is at least partially delimited inward in the radial direction; and
a guide vane, which is arranged at least partially in the duct and which can rotate around an axis of rotation relative to the casing element and relative to the first duct segment and the second duct segment,
wherein the guide vane has a first retaining segment screwed into the casing element radially from the outside, a first tab of the first duct segment is disposed within a first groove of the casing element in a detachable manner, and a second tab of the first retaining segment engaging in a second groove in the first duct segment, in the axial direction of the gas turbine, and an arm defining a portion of the second groove of the first duct segment engages in a third groove in the first retaining segment defined in part by the second tab, in the axial direction of the gas turbine;
wherein the second duct segment is fastened to the guide vane and is retained on the casing element via the guide vane, which is mounted on the casing element via a bushing, which is inserted in the radial direction from outside to inside into a passage opening of the casing element, and
wherein the second tab is disposed radially inward of a threaded portion of the first retaining segment.

11. The guide according to claim 10, wherein a third duct segment, which is spaced apart from the first duct segment in the axial direction of the gas turbine, and a second guide vane, which can rotate around an additional axis of rotation, which is spaced apart in the axial direction of the gas turbine from the axis of rotation, relative to the first duct segment, wherein the third duct segment is connected to the casing element by the first retaining segment and a second retaining segment in a detachable manner.

12. The guide according to claim 10, wherein said first duct segment, which is close to an outlet opening in said casing element, is connected to the casing element by a third retaining segment in a detachable manner.

13. The guide according to claim 12, wherein the retaining segment, by which the first duct segment is connected to the casing element, is undivided in its circumferential direction.

14. The guide according to claim 10, wherein the first retaining segment, by which the first duct segment is connected to the casing element, is arranged on a side of this first duct segment that faces an outlet opening of the casing element.

15. The guide according to claim 10, wherein a sealing disc is arranged in a gap between a passage opening of the first duct segment and a region of the guide vane that engages through the passage opening.

16. The guide according to claim 10, wherein the sealing element is retained on the second duct segment via a centering spoke.

17. The guide according to claim 10, wherein the guide is configured and arranged for use in a gas turbine.

18. The guide according to claim 10, wherein a third duct segment, which is spaced apart from the first duct segment in the axial direction of the gas turbine, is connected to the casing element by the first retaining segment and by a second retaining segment.

\* \* \* \* \*